C. H. McARTHUR.
SEPARATING MACHINE.
APPLICATION FILED NOV. 7, 1919.

1,336,848.

Patented Apr. 13, 1920.
4 SHEETS—SHEET 3.

C. H. McARTHUR.
SEPARATING MACHINE.
APPLICATION FILED NOV. 7, 1919.

1,336,848.

Patented Apr. 13, 1920.
4 SHEETS—SHEET 4.

UNITED STATES PATENT OFFICE.

CHARLES H. McARTHUR, OF CLEVELAND, OHIO.

SEPARATING-MACHINE.

1,336,848.     Specification of Letters Patent.     Patented Apr. 13, 1920.

Application filed November 7, 1919. Serial No. 336,333.

*To all whom it may concern:*

Be it known that I, CHARLES H. MCARTHUR, a citizen of the United States, residing at Cleveland, in the county of Cuyahoga and State of Ohio, have invented certain new and useful Improvements in Separating-Machines, of which the following is a specification.

This invention relates to a machine designed particularly for use in removing wrappers from mutilated sticks of gum.

In the course of manufacture of gum and during the wrapping process thereof the finished sticks of gum are frequently broken or so mutilated by the forming and wrapping machines that it is impossible to offer the same for sale to the public. The frequent occurrence of this results in a great amount of gum being thrown aside and in order to salvage this gum it has heretofore been necessary to employ manual labor in removing the portions of the wrappers within which the gum has previously been sealed, and this process was therefore necessarily slow and due to the employment of manual labor, expensive. It is the purpose of this invention to accomplish this result by machine work thereby reducing the factory cost to a minimum.

The machine hereinafter described consists of a device which will be simple, efficient, cheap of manufacture and very durable, and one in which the operating parts are so constructed as to prevent the possibility of their becoming inoperable.

The invention further consists in the certain combination of parts and constructions hereinafter fully described and particularly pointed out in the appended claims.

Figure 1:
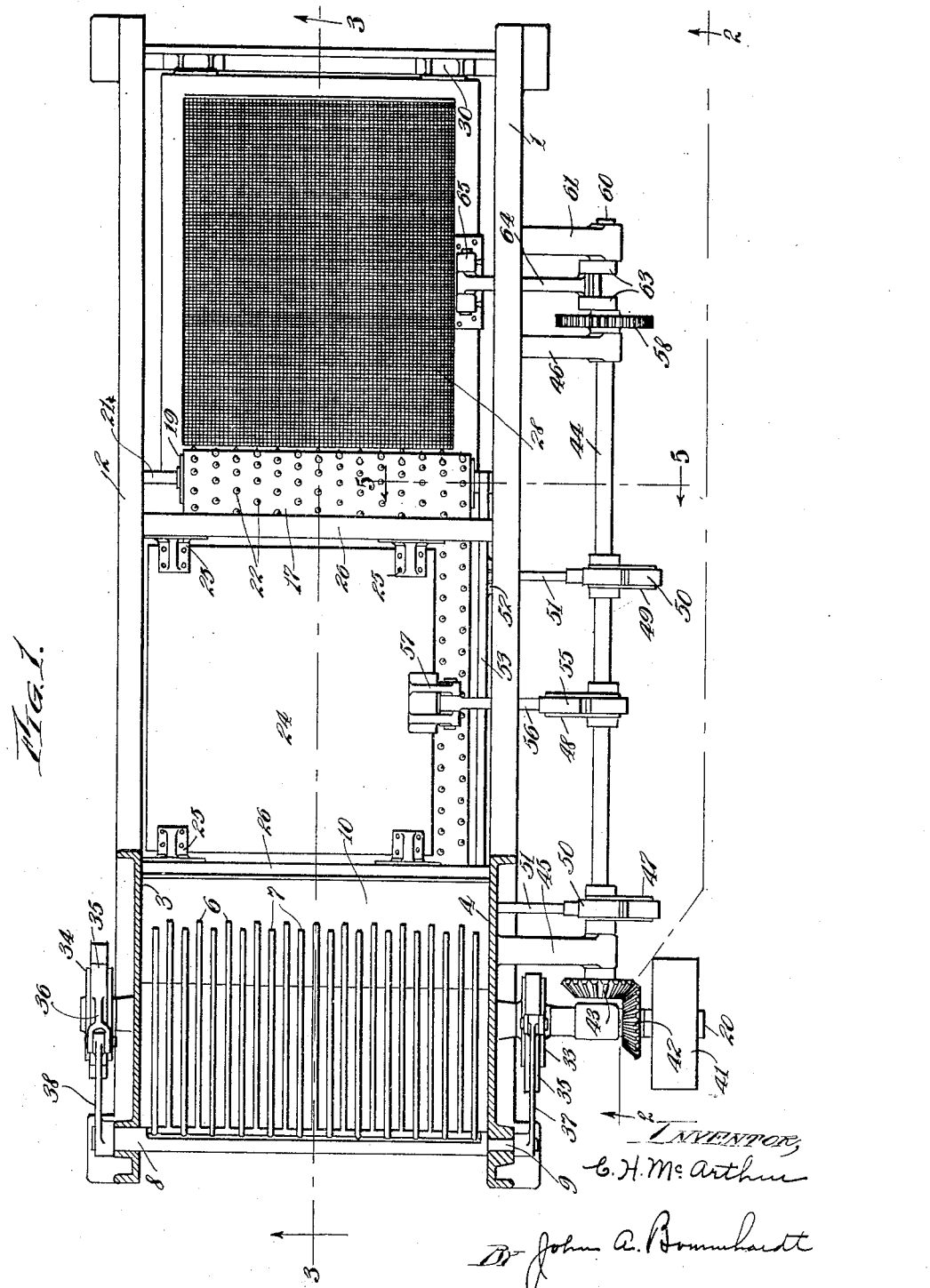
Figure 2:
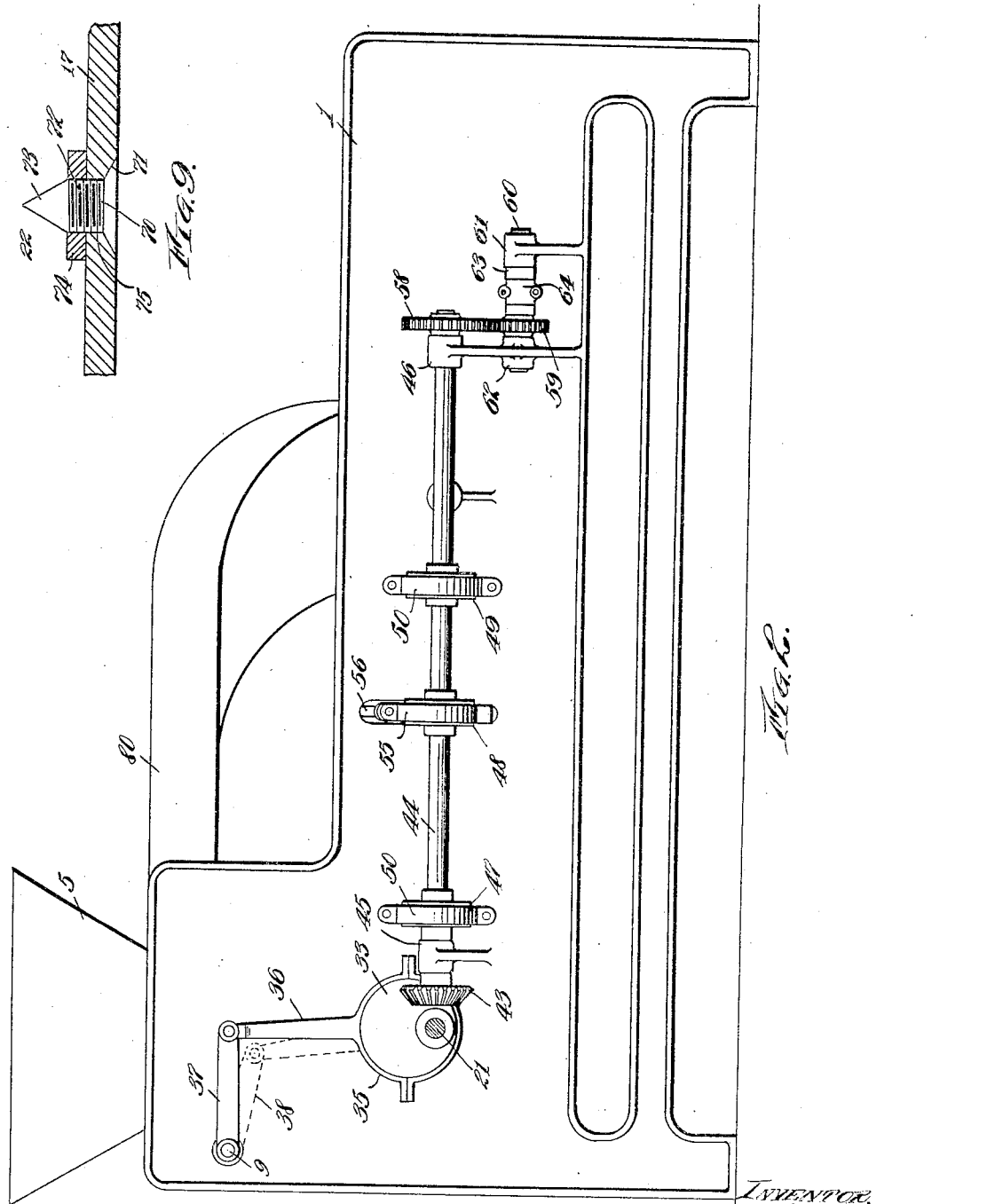
Figure 3:
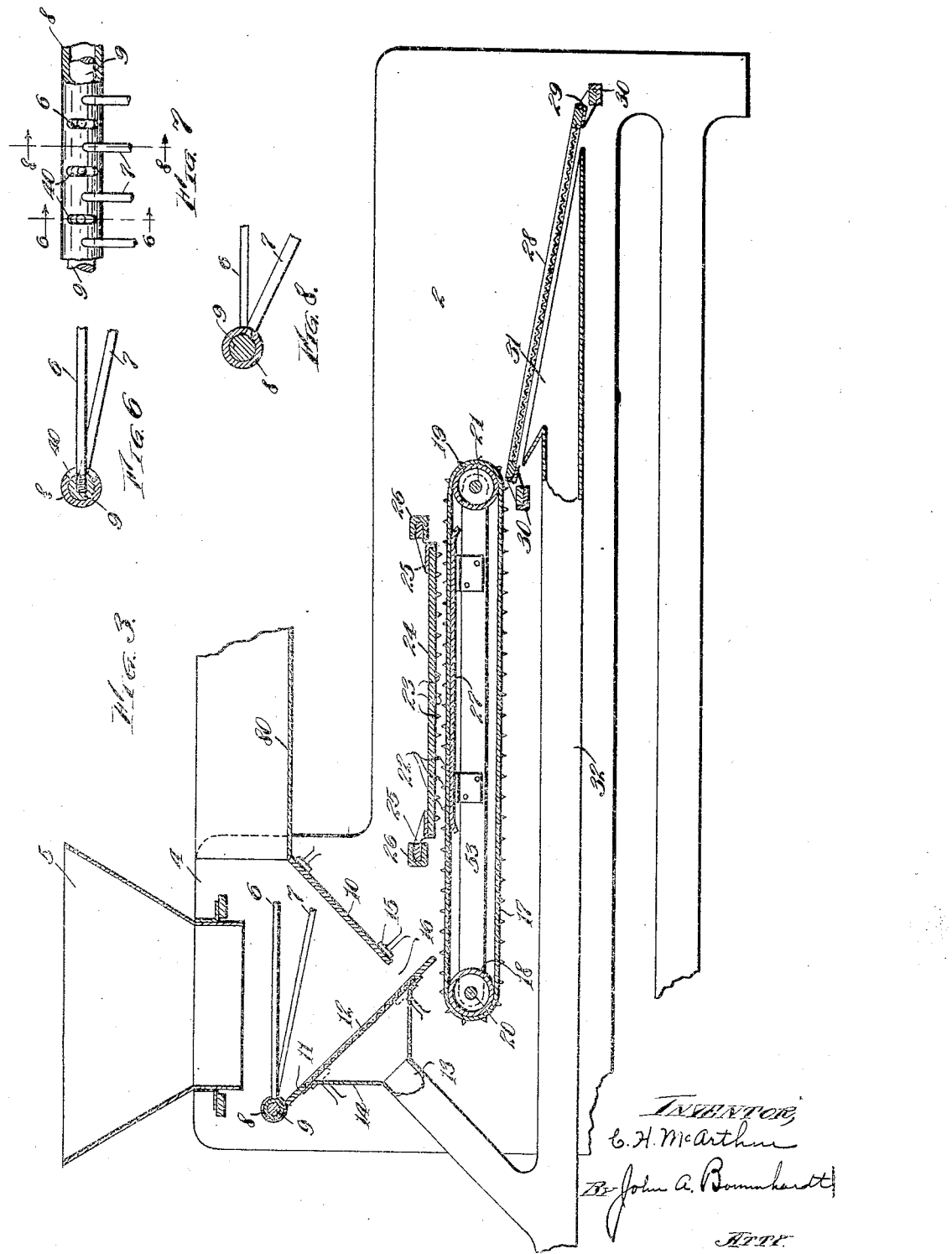
Figure 4:
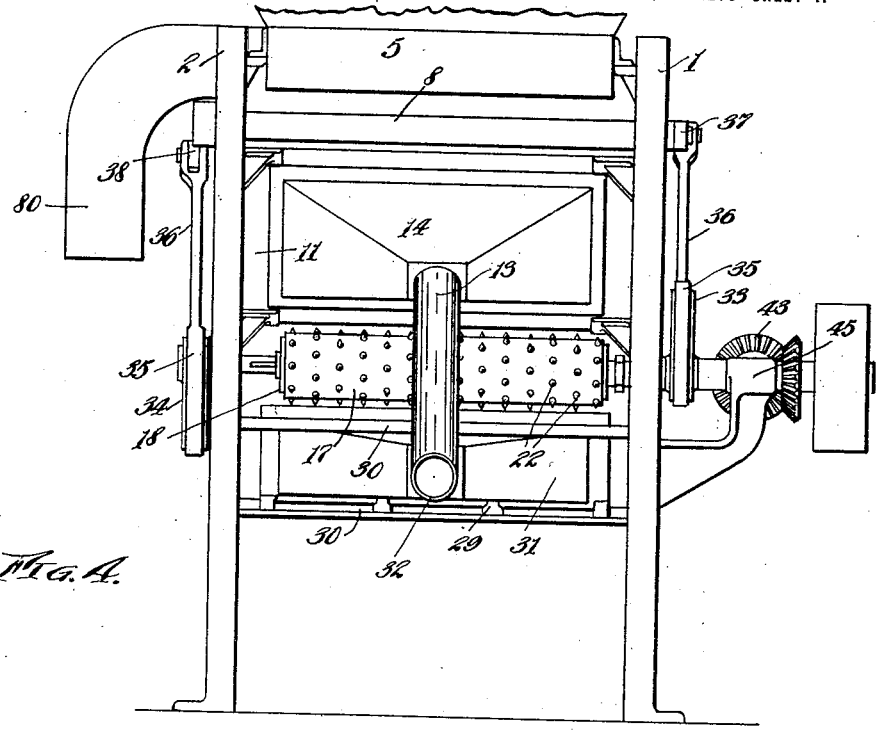
Figure 5:
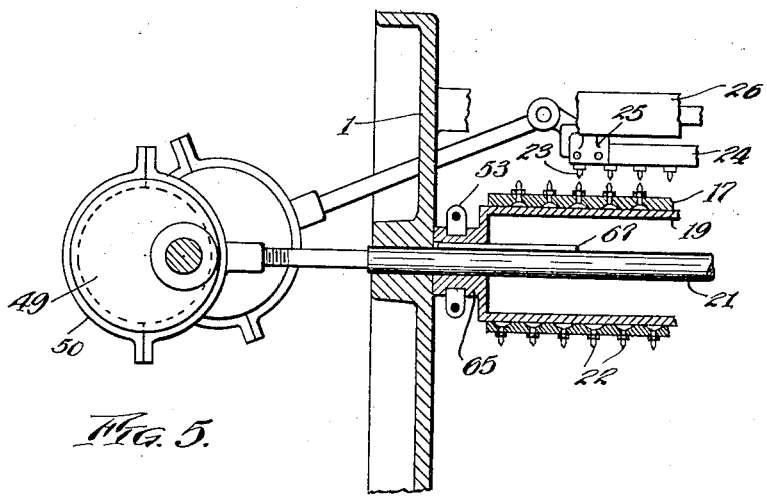

Reference being had to the accompanying drawings in which Figure 1 is substantially a plan view of the device constructed in accordance with the principles above set forth; Fig. 2 is substantially a side elevation as indicated by the line 2—2 of Fig. 1; Fig. 3 is a vertical central section through the machine; Fig. 4 is an end elevation as viewed from the left of Fig. 2; Fig. 5 is a transverse section on the line 5—5 of Fig. 1; Figs. 6, 7 and 8 are details of the separating fingers showing the manner of attachment to their respective shaft and Fig. 9 is a detail showing the manner in which the teeth are secured to the belt.

It being understood that like reference numerals designate similar parts of reference throughout the various views, the machine comprises a frame consisting of the side frames 1 and 2 between which is supported the actuating mechanism. The side frames are provided at the left hand ends with vertical extensions 3 and 4 which support therebetween a hopper 5. This hopper may be provided with a valve for controlling the feed of the gum, and the gum is discharged from the hopper upon the tops of stripping fingers 6 and 7 mounted respectively upon concentric hollow and solid shafts designated at 8 and 9. From the stripping fingers the gum drops upon guide plates 10 and 11. The plate 11 is provided at its central portion with a screen 12 which permits a blast of air to be forced against the gum through the pipe 13 which is provided with an enlarged nozzle 14 corresponding in area to that of the screen 12. The plates 10 and 11 are supported upon lugs 15 preferably formed as a part of the main casting 1 and 2. From the plates the gum is discharged through the opening 16 at the bottom of said plates upon an endless belt or conveyer 17. This conveyer is mounted upon drums 18 and 19, said drums being mounted upon their respective shafts 20 and 21 in such a manner as to provide for lateral movement, as will be more fully described hereinafter.

The aforementioned conveyer is provided with a plurality of sharpened teeth 22 which at certain points in the movement of the belt come very nearly into engagement with a plurality of like teeth 23 secured to the bottom of a plate 24, which plate is carried by brackets 25 which operate in cross slide-ways 26. These slide-ways are of channel formation and may be conveniently secured at their ends to the frames 1 and 2, providing thereby for a lateral movement of the plate 24 between the frames 1 and 2 and in a manner to be described. At the point where the teeth 22 come within the limits of the plate 24 the conveyer belt 17 is prevented from sagging by the supporting structure 27 carried by the drums 18 and 19 in a manner to be described.

From the conveyer the gum is discharged upon a screen 28. This screen is placed at an angle to discharge the gum into a receptacle beneath it at its discharge end and is supported by means of brackets 29 which in turn are mounted upon slide-ways 30 secured at their ends to the frames 1 and 2.

The screen 28 is also provided with mechanism for imparting to it a vibrating motion as will more fully appear hereinafter. Beneath the screen 28 a second discharge opening is provided at the end of a pipe 32 whereby a blast of air may be directed upwardly through the screen.

The hereinbefore mentioned stripping fingers 6 and 7 are given vibratory motions, the fingers which are mounted upon the shaft 8 alternating with those upon the shaft 9 during said motions. The movement of said fingers is produced by eccentrics 33 and 34 mounted upon the opposite ends of the shaft 21. The eccentrics may be provided with the customary straps 35 which have projecting upwardly therefrom the arms 36 which have pivotal connection with the arms 37 and 38. The arm 37 is rigidly fixed to the shaft 9 and the arm 28 is rigidly fixed to the hollow shaft 8. The high points of the eccentrics 33 and 34 being offset with respect to each other, it will thus be seen that an alternate rocking movement is imparted to the two shafts 8 and 9. The fingers 7 being fixed to the shaft 9 must necessarily project through the hollow shaft 8 and to permit this arcuate slots 40 are provided in the hollow shaft 8 allowing the fingers 6 freedom of movement therethrough.

The shaft 20 upon which one end of the conveyer belt 17 is carried is also the power shaft. It may receive its driving motion through the pulley 41 being attached to its end and from any convenient source thereto.

The shaft 20 has provided at a point near the pulley 41 a bevel gear 42 which meshes with a corresponding gear 43 upon the end of a longitudinal shaft 44. This shaft 44 is mounted within bearings 45 and 46 preferably made integral with the side frame 1 and has fixed thereon and at a point intermediate of the bearing three eccentrics, 47, 48 and 49. The eccentrics 47 and 49 are provided with the customary straps 50, said straps having extending arms 51 which are pivoted at their ends remote from the eccentrics to brackets 52, which are secured upon a strap 53 which extends longitudinally of the belt 17 and which is conveniently secured to the hubs 54 and 55 of the drums 18 and 19. The method of securing said strap will be more fully described hereinafter and permits the drums to rotate in a manner to propel the belt in a given direction, but is also so secured thereon that a lateral movement is to be had of the belt in such a manner as to prevent the aforesaid drums from binding upon their respective shafts during the lateral motion imparted to the drums. As previously stated the plate 24 is also given a lateral motion and this is preferably produced alternately with respect to the conveyer 17 and the means for accomplishing the motion thereof comprise the aforesaid eccentric 48 which in order to move alternately with respect to the belt must necessarily have its high point at a convenient angle to the high points of the eccentrics 47 and 49. The eccentric 48 is provided with the customary strap 55 which has integral therewith the connecting rod 56 which has its opposite end pivotally secured to a bracket 57 secured to the top of the plate 24. Thus it will be seen that upon the rotation of the shaft 44 lateral reciprocatory motions are imparted to the conveyer belt 17 and plate 24. The shaft 44 has secured upon the end projecting to the right of the bearing 46 a spur gear 58 which meshes with a spur pinion 59 secured upon a short shaft 60 rotatably secured within the bearings 61 and 62. This shaft is located beneath the shaft 44 and at the end thereof and is provided at a point between the two bearings 61 and 62 with a crank 63 which has secured thereon the connecting rod 64 which has its opposite end pivotally secured between the upstanding ears of a bracket 65 rigidly fixed to the side of the screen 28. The construction thus provides for a vibrating motion being imparted to the screen and at an increased speed compared to that of the other moving parts.

Reference has heretofore been made to the manner in which the strap 53 is secured to the drums 18 and 19 and this construction will now be more fully described.

The drums are provided at their ends with heads having integral therewith the hubs 65, and said hubs are provided with annular grooves 66 within which are located the straps 53, said straps being provided with split ends which may be bolted thereon and which permit the strap to be rotatably secured upon the hub 65. This appears most clearly in Fig. 5. It being understood that the formation of both drums is identical only one end of one drum has therefore been shown in detail. The drum 18 is connected to the shaft 20 by a spline 67 secured upon the shaft and this is also embodied upon the drum 19 and its hub portion, although it will be understood that it is necessary only upon the drum 18. The drums may therefore be slid back and forth on the shafts as they rotate.

The aforementioned teeth 22 each comprise a stud 70 provided with a conical tapered head 71, a cylindrical portion 72, and a conical point 73. The portion 72 is threaded a short distance from the point at which the tapered portion begins, to permit the nut 74 being screwed thereon. Thus by passing the stud through suitable apertures 75 in the belt and applying the nut 74 the stud may be effectively clamped in position.

With the parts constructed as described the operation is as follows: The mutilated gum inclosed in its wrappers is fed into the hopper 5, from there it is discharged upon the top of the stripping fingers 6 and 7, these fingers are placed closely enough together to permit of the gum being tossed about in such a manner as to effectively loosen and partially remove the wrapper. The wrappers being lighter than the gum are caught by the blast of air coming through the screens and are carried to the chute 80 provided for this purpose. This chute has its discharge opening extending to the side of the machine and discharges the wrappers in a container which may be placed therebeneath. The remaining parts of the gum and their wrappers then fall upon the plate 10 and gravitate through the opening 16 and to the conveyer belt 17. At this point they are picked up by the teeth and are carried to the right as viewed in Fig. 3. As they pass beneath the plate 24 which is also provided with teeth on its lower face and which, it will be remembered, is given a lateral motion, the wrappers are torn and mutilated by the grinding motion imparted by the two sets of teeth 22 and 23 so that as they come into position to be discharged upon the screen 28 the blast of air directed upon the underneath portion of the screen is sufficient to thoroughly separate the particles of paper from the particle of gum, allowing the gum to fall to the edge of the screen 28 and from there to a suitable container which is placed therebeneath.

The paper being very much lighter than the gum is carried a considerable distance from the container by the said blast of air. Thus it will be seen that a machine is provided which will be found very efficient in accomplishing the purpose for which it was designed and while I have shown and described this specific construction of elements it is evident that various modifications may be had in the structural details thereof, all of which will come within the scope of the appended claims and I do not wish to limit myself further than is required by the state of the art to which this class of invention pertains.

I claim:

1. In a separating machine, the combination of a traveling belt on which the material to be separated is placed, and a plate vibrating laterally above the belt, said belt and plate being provided with teeth adapted to engage said material.

2. In a separating machine, the combination with a traveling belt upon which the material to be separated is placed, means to reciprocate the belt laterally as it travels longitudinally, and a laterally reciprocating plate located above the belt, said belt and plate being provided with teeth adapted to engage the material therebetween.

3. In a separating machine, the combination with a pair of guide frames, and a pair of shafts extending across between said frames, of a drum slidable lengthwise, upon and rotating with each shaft, means to rotate the shafts, means to slide the drums thereon, an endless belt extending around the drums, and a plate extending across the upper run of the belt, said belt and plate being provided with teeth adapted to engage material therebetween.

4. In a separating machine, the combination with a pair of side frames, of a traveling belt conveyer running between the frames, said belt being also movable laterally, means to impart lateral movement to the belt in addition to its longitudinal movement, a pair of guides extending across above the belt and between the frames, a plate mounted to reciprocate laterally in said guides, and means to reciprocate the plate, said belt and plate being provided with teeth on their adjacent surfaces adapted to engage material therebetween.

5. In a separating machine, a belt provided with teeth, each tooth consisting of a threaded stud extending through the belt, and provided with a head and a point, and a clamp nut on the stud, the belt being clamped between the head of the stud and the nut.

6. In a separating machine, the combination with a belt and plate between which the material is passed, said belt and plate being provided with teeth to engage said material, of a vibrating screen at the discharge end of the belt adapted to receive the material therefrom, and means to force a blast of air through the screen.

In testimony whereof, I do affix my signature in presence of two witnesses.

CHARLES H. McARTHUR.

Witnesses:
JOHN A. BOMMHARDT,
ROBERT L. BRUCK.